United States Patent [19]

Roche

[11] 4,336,959
[45] Jun. 29, 1982

[54] JOINT RESTRAINER SYSTEM

[75] Inventor: Charles W. Roche, Northboro, Mass.

[73] Assignee: Uni-Flange Corporation, Northboro, Mass.

[21] Appl. No.: 161,038

[22] Filed: Jun. 19, 1980

[51] Int. Cl.³ ............................................. F16L 17/02
[52] U.S. Cl. .................................... 285/368; 285/415; 285/423
[58] Field of Search ............... 285/368, 233, 412, 337, 285/423, 413, 414, 415

[56] References Cited

U.S. PATENT DOCUMENTS

| | | | |
|---|---|---|---|
| 1,014,053 | 1/1912 | Dolensky | 285/368 |
| 1,098,409 | 6/1914 | Rosenfeld | 285/400 |
| 1,186,621 | 6/1916 | Townsend . | |
| 1,960,472 | 5/1934 | Balaam et al. | 285/422 |
| 2,277,990 | 3/1942 | Lanninger | 285/414 |
| 2,402,868 | 6/1946 | Boyle . | |
| 2,507,261 | 5/1950 | Mercier . | |
| 2,738,993 | 3/1956 | Wilson . | |
| 2,923,561 | 2/1960 | Merrill | 285/413 |
| 3,004,780 | 10/1961 | Main . | |
| 3,135,538 | 6/1964 | George . | |
| 3,627,357 | 12/1971 | Sanders . | |
| 3,823,216 | 7/1974 | Petzetakis | 285/423 |

FOREIGN PATENT DOCUMENTS

| | | | |
|---|---|---|---|
| 910932 | 9/1972 | Canada | 285/368 |
| 2459255 | 6/1976 | Fed. Rep. of Germany | 285/368 |
| 1420486 | 11/1965 | France . | |
| 2310518 | 3/1976 | France . | |

OTHER PUBLICATIONS

Rockwell International ad from Water and Sewage Works, p. 9, Mar. 1979.

Primary Examiner—Dave W. Arola
Attorney, Agent, or Firm—Blodgett & Blodgett

[57] ABSTRACT

Restrainer for joint in plastic conduit consisting of a retainer ring and a clamping ring drawn together by bolts.

4 Claims, 9 Drawing Figures

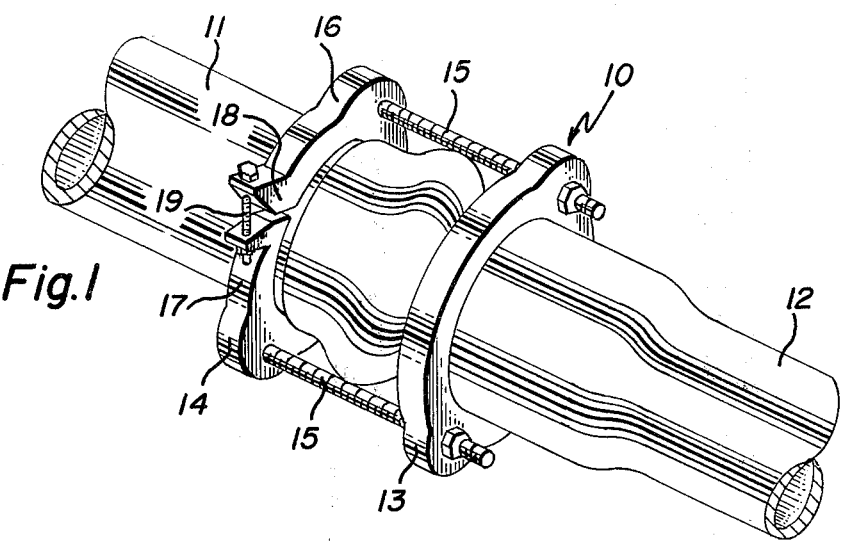
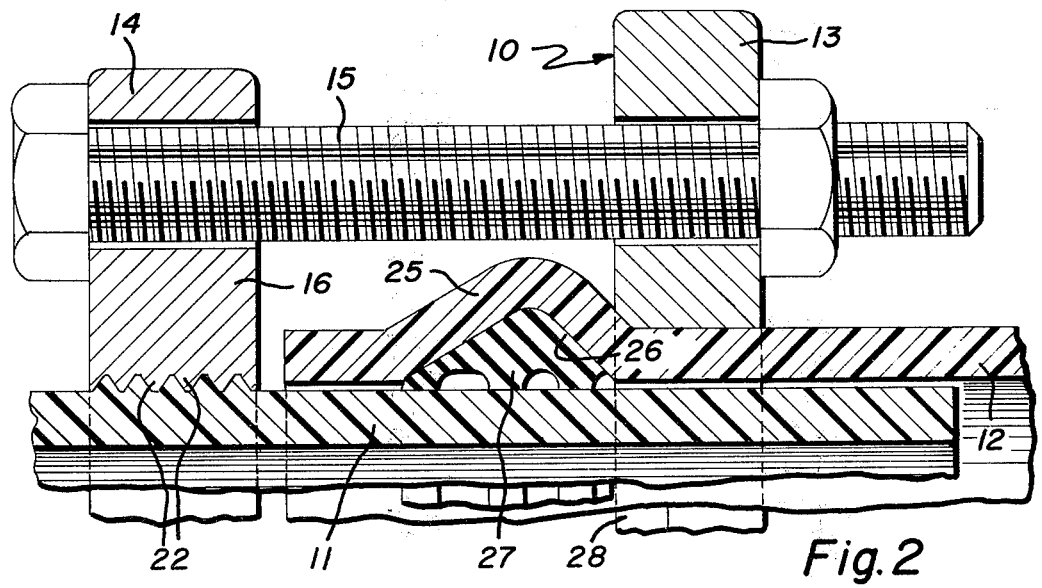
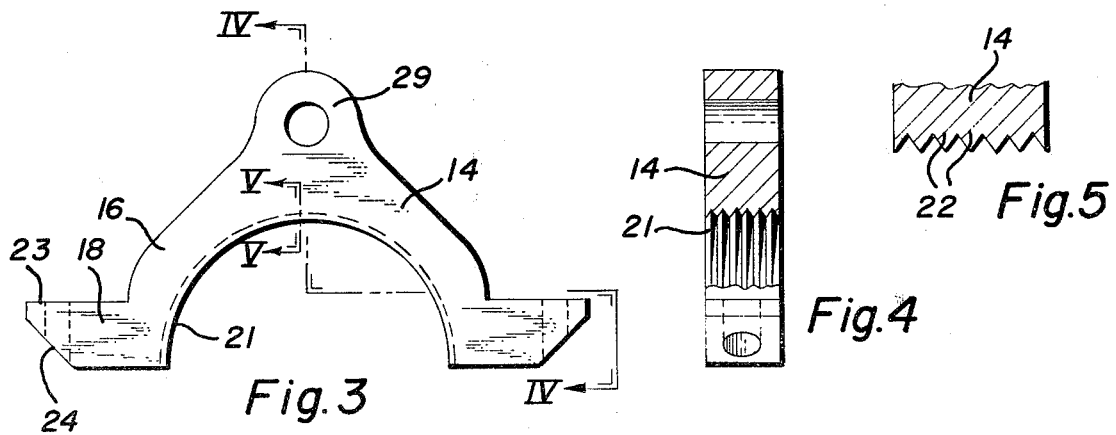

JOINT RESTRAINER SYSTEM

BACKGROUND OF THE INVENTION

It has recently become common practice to make up piping systems for water and the like by use of plastic conduit such as polyvinyl chloride. When joints are made up using such plastic conduits, it would be relatively easy to make up tight joints if the two ends to the joined were provided with flanges or the like which can be bolted together. It is much more convenient, however, to fabricate conduits with enlarged portions or bells which can be fitted over the straight or plain end of the adjacent conduit. In this way, the straight end of the next conduit can be cut to size if necessary. In the case of small domestic plastic pipe, the joint can be made up by cementing the two conduits together. When the water system, however, involves larger diameters and pressures, it is difficult to obtain a secure joint simply by cementing the conduits together. Attempts have been made in the past to solve this problem by providing pressure joints. When this is done, one encounters the fact that the plastic is not as rigid as would be true with cast iron conduits, for instance. Therefore, it is not possible to provide the necessary pressure for good sealing and for a non-slip joint. These and other difficulties experienced with the prior art devices have been obviated in a novel manner by the present invention.

It is, therefore, an outstanding object of the invention to provide a joint retainer for providing tight slip-proof joints in plastic conduit.

Another object of this invention is the provision of a joint retainer, particularly for joining plane or straight plastic pipe connected by a slip joint to a pipe having an enlarged end.

A further object of the present invention is the provision of a joint retainer for holding conduit joints together and for preventing slippage.

It is another object of the instant invention to provide a joint retaining means which is simple in construction, which is inexpensive to manufacture, and which is capable of a long life of useful service.

With these and other objects in view, as will be apparent to those skilled in the art, the invention resides in the combination of parts set forth in the specification and covered by the claims appended hereto.

SUMMARY OF THE INVENTION

In general, the invention consists of a joint retaining system, particularly with use in a telescoping junction between two conduits. A retainer ring extends around and is locked to one of the conduits adjacent its end and a clamping ring extends around and is locked to the other of the conduits adjacent its end. Bolts extend between the retainer ring and the clamping ring to prevent longitudinal movement between the two conduits.

More specifically, the clamping ring consists of two semi-circular elements having corresponding end flanges. The elements are drawn together by bolts running through the flanges, each element having an inner cylindrical surface provided with serrations that bites into the surface of the conduit. Each flange consists of a generally radial surface facing away from the corresponding flange of the other element and an inclined surface lying at a substantial acute angle to the radial surface.

BRIEF DESCRIPTION OF THE DRAWINGS

The character of the invention, however, may be best understood by reference to one of its structural forms, as illustrated by the accompanying drawings, in which:

FIG. 1 is a perspective view of a joint retainer incorporating the principles of the present invention, FIG. 2 is an enlarged sectional view of a portion of the joint retainer, FIG. 3 is a front elevational view of a portion of a clamping ring, FIG. 4 is a vertical sectional view of the clamping ring taken on the line IV—IV of FIG. 3, FIG. 5 is an enlarged sectional view of a portion of the clamping ring taken on the line V—V of FIG. 3.

DESCRIPTION OF THE PREFERRED EMBODIMENT

Figure 8:
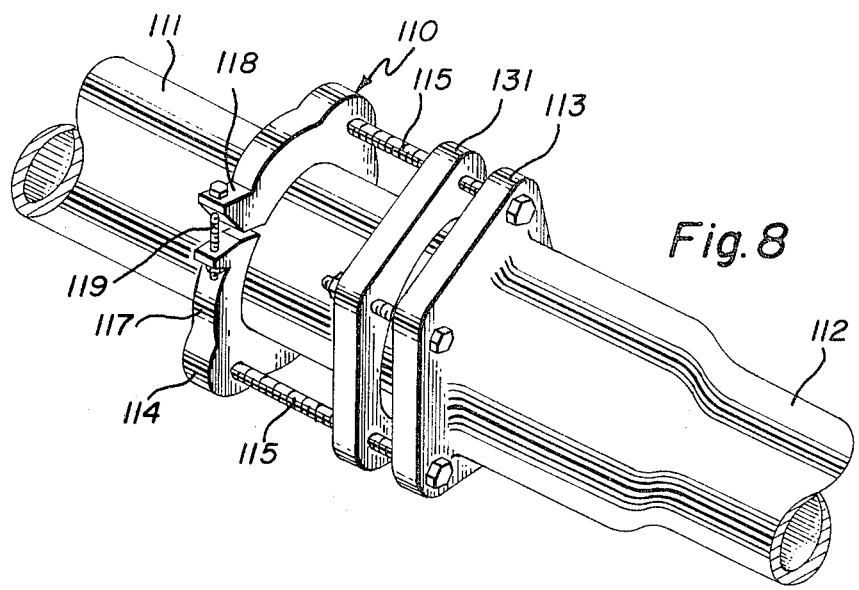
FIG. 8 is a perspective view of a modified form of the joint retainer.

Referring first to FIG. 1, wherein are best shown the general features of the invention, the joint restrainer, indicated generally by the reference numeral 10, is shown in use with a telescoping junction between the ends of two conduits 11 and 12. The retainer ring 13 extends around and is locked to the conduit 12 adjacent its end and a clamping ring 14 extends around and is locked to the other conduit 11 adjacent its end. Bolts 15 extend between the retaining ring 13 and the clamping 14 to prevent longitudinal movement between the two conduits.

Referring to FIGS. 1 and 2, the clamping ring 14 consists of two semi-circular elements 16 and 17 having corresponding end flanges 18 that are drawn together by bolts 19 running through the flanges. Each of the elements 16 and 17 has an inner cylindrical surface 21 provided with serrations 22 (see FIG. 5) that are capable of biting into the surface of the conduit 11.

As is best evident in FIGS. 3 and 4, the flange 18 consists of a generally radial surface 23 facing away from the corresponding flange of the other element 17 and an inclined surface 24 which lies at a substantial acute angle to the radial surface.

Figure 6:
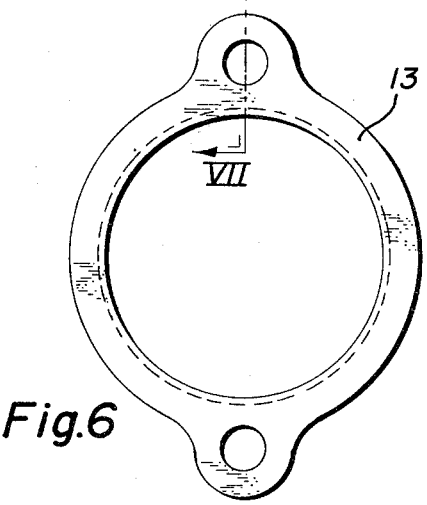
FIG. 6 is an elevational view of a retaining ring forming part of the invention.
Figure 7:
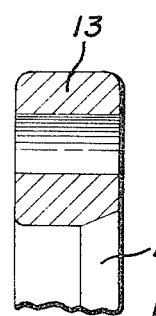
FIG. 7 is an enlarged sectional view of a portion of the retaining ring taken on the line VII—VII of FIG. 6.

Referring next to FIGS. 1 and 2, it can be seen that the conduit 12 is provided with annular outwardly-extending corrugation 25 adjacent its end. The retaining ring 13 extends around the conduit 12 and presses against the corrugation. The corrugation 25 defines an inwardly-directed groove 26 in which lies an elastomer seal 27. The retaining ring 13 has a beveled corner 28 (see FIGS. 6 and 7) that engages the corrugation with a camming action. Each of the elements 16 and 17 of the clamping ring 4 is provided with an outwardly-extending ear 29 through which passes one of the bolts 15 that extends between the rings.

Figure 9:
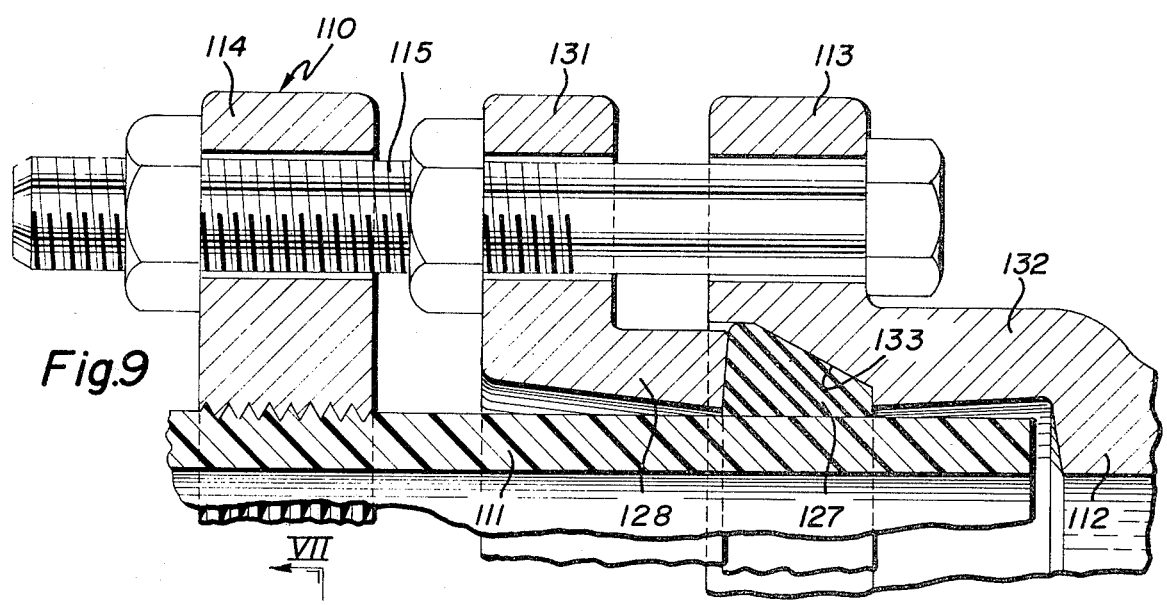
FIG. 9 is a sectional view of a portion of the joint retainer shown in FIG. 8.

Referring to FIGS. 8 and 9, which shows a modified form of the invention, the joint restrainer 110 is shown in use with conduits 111 and 112. The retainer ring 113 extends around and is integral with the conduit 112. The clamping ring 114 extends around and is locked to the conduit 111 adjacent its end. Bolts 115 extend between the retainer ring 113 and the clamping ring 114 to prevent longitudinal movement between the two conduits 111 and 112. The clamping ring 114 is similar to the clamping ring 14 of FIG. 1 in that it consists of two semi-circular elements 116 and 117 having corresponding end flanges 118 that are drawn together by bolts 119 running through the flanges. As in the previously-described embodiment, each element has an inner cylindrical surface provided with serrations that are capable of biting into the surface of the conduit which is made of polyvinyl chloride. Furthermore, each flange consists of a generally radial surface facing away from the corresponding flange of the element and an inclined surface lying at a substantial acute angle to the radial surface.

A sealing ring 131 extends around the conduit 111, is bolted to the retainer ring 113 and has an axially-extending tubular flange 128 that presses against a seal 127 lying between the two conduits. The conduit 112 is provided with a bell 132 which fits around the end of the other conduit 111. The bell has an integral radial flange that acts as the retaining ring 113 and also has a beveled mouth 133 in which the seal 127 resides.

The operation and the advantages of the present invention will now be readily understood in view of the above description. Referring to FIGS. 1 and 2, it can be seen that the clamping ring 14 is placed on the conduit 11 and the bolts 19 are tightened. At the same time, the retaining ring 13 is slid onto the conduit 12 until it lies against the surface of the corrugation 25. The bolts 15 are then inserted in place and all the bolts are pulled up tight. The bolts 13 are tightened first, thus causing the serrations 22 to bite into the surface of the conduit 11 which is formed of polyvinyl chloride or the like. This locks the clamping ring 14 in place and prevents it from moving longitudinally over the surface of the conduit. The bolts 15 are then tightened up pulling the bevel 28 of the retainer ring 13 up tightly against the corrugation 25. The camming action between the bevel 28 and the sloped surface of the corrugation presses the seal 27 tightly in place. At the same time the tension in the bolts 15 prevents any movement of the conduit 12 away from the conduit 11 when hydraulic pressure is applied to the interior of the conduit.

In a similar way, referring to FIGS. 8 and 9, the clamping ring 114 is tightly engaged on the conduit 111. The nuts on the bolts 115 extending between the retainer ring 113 and the sealing ring 131 cause a compression of the seal 127 upon the surface of the conduit 111. At the same time, the drawing up of the nut on the bolts 115 causes the clamping ring 14 to hold the retainer ring 113 tightly in place, which means that the conduits 111 and 112 cannot move longitudinally despite hydraulic pressure on the interior of the conduits.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Joint restrainer for use with the junction formed by the ends of two conduits in which the end of a first of two conduits is telescopingly located within the end of a second of said two conduits, wherein one of the conduits has an annular outwardly-extending corrugation adjacent to, but spaced from, its end, said joint restrainer comprising:
    (a) a retainer ring extending around and locked to one of said conduits by pressing against the corrugation,
    (b) a clamping ring extending around the other of said conduits adjacent its end, said clamping ring consisting of two semi-circular elements having corresponding end flanges, each element having an inner cylindrical surface provided with serrations,
    (c) first bolt means extending through the end flanges of the clamping ring for drawing the two semi-circular elements together and causing said serrations to bite into said other conduit for locking the clamping ring to said other conduit, and
    (d) second bolt means extending between the retainer ring and the clamping ring to prevent longitudinal movement of said one conduit away from said other conduit.

2. Joint restrainer as recited in claim 1, wherein each flange consists of a generally radial surface facing away from the corresponding flange of the other element, and an inclined surface lying at a substantial acute angle to the radial surface.

3. Joint restrainer as recited in claim 1, wherein said corrugation defines an inwardly-directed groove in which lies an elastomer seal, the retaining ring having a beveled corner that engages the corrugation with a camming action.

4. Joint restrainer as recited in claim 1, wherein each element of the clamping ring is provided with an outwardly-extending ear through which passes the second bolt means.

* * * * *